(12) United States Patent
Crunk et al.

(10) Patent No.: US 6,254,262 B1
(45) Date of Patent: *Jul. 3, 2001

(54) SIGNALING LAMP HAVING LED LIGHT ARRAY WITH REMOVABLE PLASTIC LENS

(76) Inventors: Paul D. Crunk, Box 725, Taylor, MI (US) 48180-0725; Peter J. Crunk; Katherine A. Crunk, both of 10970 Pine St., Taylor, MI (US) 48180

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,694

(22) Filed: Nov. 27, 1998

(51) Int. Cl.[7] .................................................. F21V 29/00
(52) U.S. Cl. .......................... 362/544; 362/310; 362/362; 362/545; 362/499; 362/267; 362/331; 362/369
(58) Field of Search .................................. 362/544, 545, 362/543, 541, 499, 505, 235, 268, 267, 800, 309, 331, 390, 369, 310, 329, 362

(56) References Cited

U.S. PATENT DOCUMENTS

| | | | |
|---|---|---|---|
| 4,156,894 | * | 5/1979 | Berry ................................... 362/267 |
| 4,733,335 | * | 3/1988 | Serizawa .............................. 362/503 |
| 5,267,131 | * | 11/1993 | Anthony et al. ...................... 362/208 |
| 5,632,551 | * | 5/1997 | Roney et al. ......................... 362/249 |
| 5,746,497 | * | 5/1998 | Machida ............................... 362/496 |
| 6,045,240 | * | 4/2000 | Hochstein ............................ 362/294 |

* cited by examiner

*Primary Examiner*—Alan Cariaso
*Assistant Examiner*—Ronald E. DelGizzi
(74) *Attorney, Agent, or Firm*—Harness, Dickey & Pierce, P.L.C.

(57) ABSTRACT

A signaling lamp allows improved serviceability and dependability. The lamp includes a light source, housing, backing and removable sealing mechanism. The housing includes a casing for coupling the housing to the backing, and a lens with a plurality of convex nodes along the interior surface for more efficiency collecting light from the light source. The modular structure and a pigtail socket achieve improved serviceability by allowing components to be individually replaceable and by increasing connectivity. Gaskets and an o-ring in conjunction with an o-ring slot formed in the backing of the lamp enhance sealing of the components. A heat sink on the backing operates to remove heat from the interior of the lamp. A current draw circuit and LED-based light source reduce the current draw to allow the lamp to use the standard battery from the primary vehicle as a power source.

13 Claims, 5 Drawing Sheets

SIGNALING LAMP HAVING LED LIGHT ARRAY WITH REMOVABLE PLASTIC LENS

TECHNICAL FIELD

This invention relates generally to vehicle exterior lighting. More particularly, the invention relates to vehicle signaling lamps with improved dependability and serviceability.

BACKGROUND AND SUMMARY OF THE INVENTION

The transportation industry widely uses signaling lamps to provide pull-behind vehicles and other vehicle extensions with lamps for the purpose of signaling to other cars. Ordinarily, these lamps must perform the functions of a tail light, turn signal and stop light. The term signaling lamp is used herein to refer to lamps capable of performing any or all of these functions. State and federal laws typically require signaling lamps in an effort to ensure safe driving on roadways. These laws subject operators of trailers and other trucks to fines and penalties for either failing to employ the lamps, or using lamps that are broken. Dependability is therefore very desirable as a means for reducing liability as well as reducing maintenance costs. Another desirable benefit is increased serviceability when lamp components fail.

Currently, when a lamp component fails, the entire lamp must be replaced. This replacement is due in large part to the permanency of current lamp designs. For example, a typical lamp will have a lens that is permanently bonded to a backing during the manufacturing process. As a result, if the lens is damaged, the entire lamp must be replaced regardless of the condition of the backing or other parts. Generally, most lamps are sealed and must be thrown away. In rare cases, the light source itself may be replaced.

The modular design of the present invention allows the signaling lamp to be completely serviceable. The present invention uses a light source, a housing, outer lens, and a backing which are all individually replaceable. The housing is made up of a casing and a lens attached to the casing, such that the casing can be coupled to the backing by a removable sealing mechanism. If the lens of the housing cracks, any ordinary user can remove the sealing mechanism, replace only the housing, and replace the sealing mechanism with minimal effort. Specifically, the sealing mechanism can include a plurality of screws disposed around the perimeter of the lamp and a sealing gasket disposed between the housing and a lateral surface of the backing. The outer lens is a removable, replaceable lens. The lens is designed to distribute the light evenly. The outer lens is attached by snapping on, twisting, or by a plurality of screws. The outer lens may also be ultrasonically fused to the case.

Current LED lamp designs are also very difficult to connect to and disconnect from to the power source during servicing because of special wire adapters necessary to connect to the power source. To improve connectivity, the present invention provides a socket hole in the backing, a pigtail socket extending from the light source through the socket hole, a connector attached to the pigtail socket, and a socket hole sealing mechanism for stabilizing the pigtail socket and moisture protection that requires no special wire adapters to connect to the power source using existing factory equipment.

Several parameters affect the dependability of signaling lamps such as moisture resistance, vibration resistance, heat resistance, and current consumption. Moisture is a common problem with non-sealed signaling lamps because of the harsh environments that trucks and trailers often encounter. For example, when moisture penetrates the interior of the lamp, rust can corrupt contacts and wiring, and ultimately reduce the life of the lamp. The present invention addresses this problem by disposing a sealing gasket between the housing and lateral surface of the backing. Furthermore, the lamp can have an o-ring disposed between the housing and a longitudinal surface of the backing. The sealing gasket and the o-ring provide extremely high resistance to moisture, and increase the overall life of the lamp by serving as a moisture barrier along two surfaces. The socket hole sealing mechanism can also protect against rust while maintaining connectivity. Specifically, the socket hole sealing mechanism can include a socket hole gasket.

Vibration causes components to jar loose and significantly reduces the life of filament containing light sources. Vibration also causes parts to break under the strong and repetitive forces. Current lamp designs contribute to the effects of vibration by positioning the light source directly adjacent to external parts. Therefore, the slightest force felt by the lamp is transferred directly to the light source. The LED does not include a filament to vibrate, shake apart, or rupture. Therefore by nature of the construction of the LED. The present invention is vibration resistant with the use of LEDs.

Heat generated by the light source of current signaling lamps and outside environment often cause stress on surrounding components. The backing of the present invention includes an external heat sink for dispersing heat from within the signaling lamp while not interfering with dimensional considerations.

Previous lamp designs also result in high current draws, which reduce the amount of power available to the rest of the electrical systems as well as reduce the types of power sources that are compatible with the lamp. The light source of the present invention includes an LED array, an LED board containing the LED array, and a current draw circuit board connected to the LED board for reducing the current draw of the signaling lamp. This reduction allows the lamp to use the standard battery from the primary vehicle. The interior surface of the internal lens also has a plurality of convex nodes matching the pattern of the LED array such that light is more efficiently collected from the light source. The external lens effectively disperse and distribute the light from the interior lens. The external also includes a combination of faucets and ridges on its interior surface.

Additional advantages and features of the present invention will become apparent from the subsequent description and the appended claims, taken in conjunction with the accompanying drawings.

BRIEF DESCRIPTION OF THE DRAWINGS

A more complete appreciation of the invention and the many attendant advantages thereof will be readily obtained as the same becomes better understood by reference to the following detailed description when considered in connection with accompanying drawings, wherein.

DETAILED DESCRIPTION OF THE INVENTION

Figure 1:
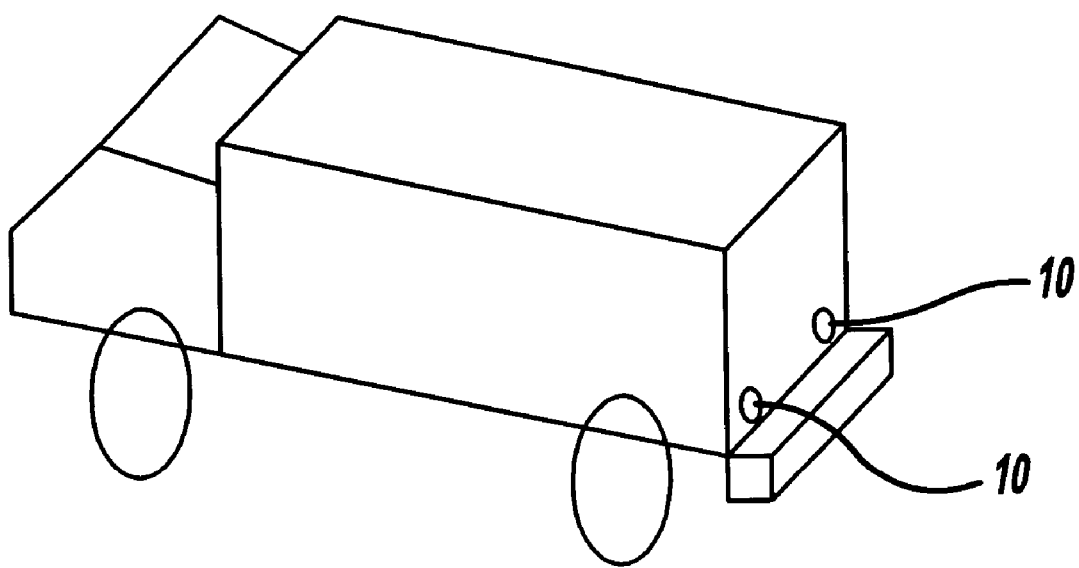
FIG. 1 is a perspective view of a truck incorporating the present invention.
Figure 2:
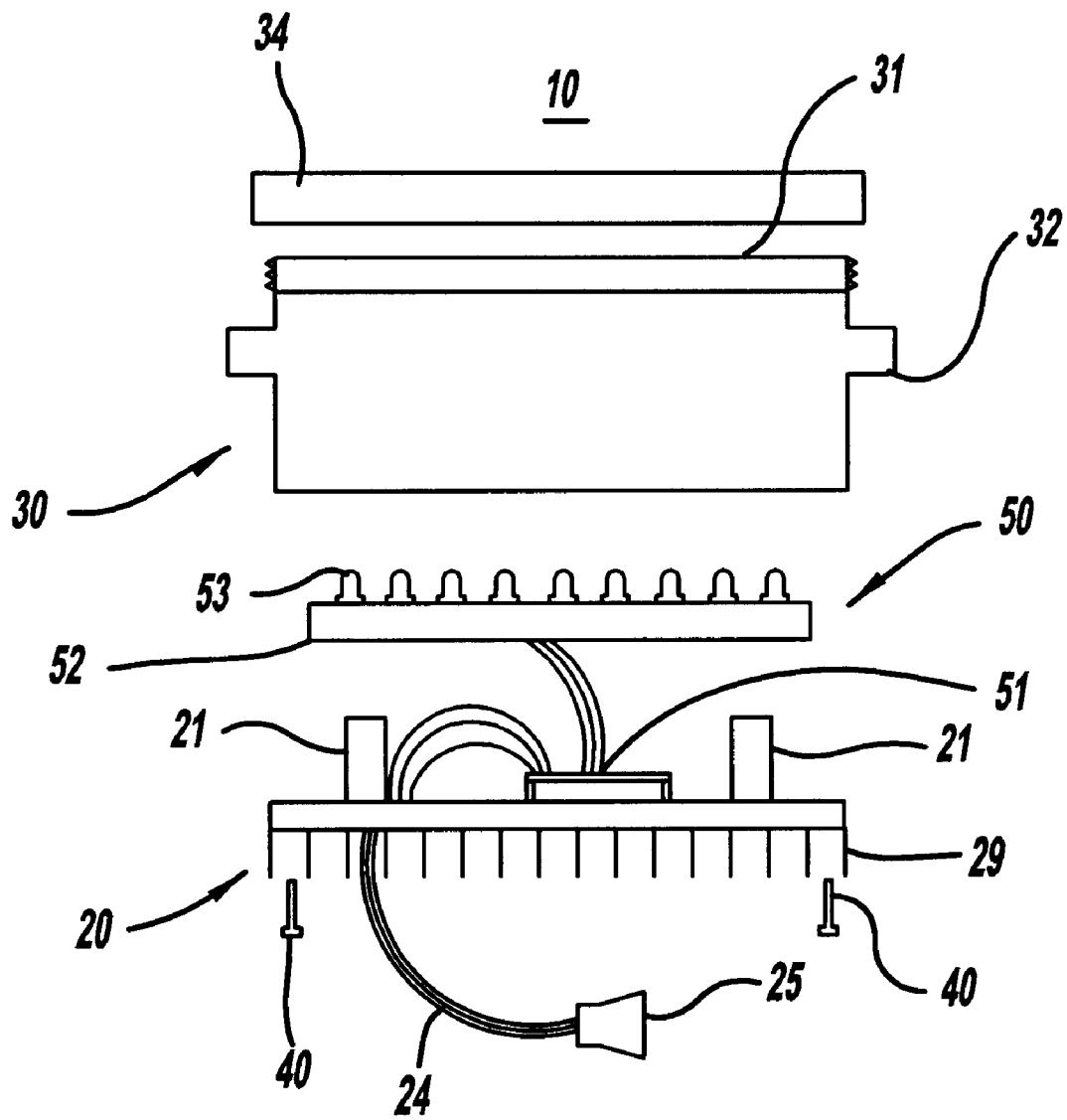
FIG. 2 is an exploded side view of the present invention.

FIG. 1 shows the signaling lamp 10 in a typical use as a truck tail light. Turning now to FIG. 2, an exploded side view of the preferred signaling lamp is shown at 10. Generally, the signaling lamp 10 has a light source 50, housing 30, backing 20, and removable sealing mechanism for coupling the housing 30 to the backing 20 such that the light source 50 is enclosed by the housing 30 and the backing 20.

Figure 3:
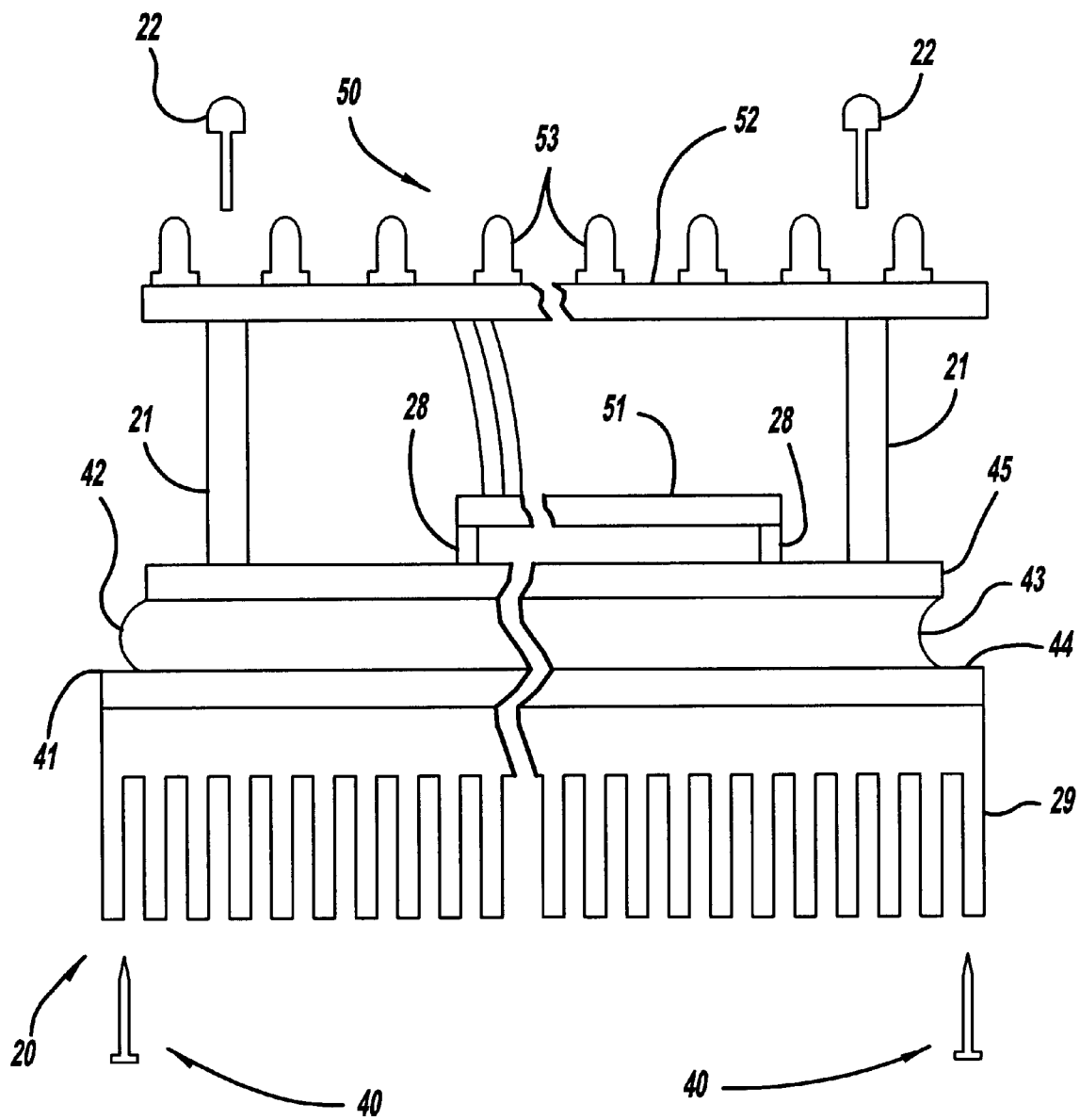
FIG. 3 is a detailed side view of the sealing mechanism of the present invention.

The sealing mechanism is best shown in FIG. 3 and has a plurality of sealing screws 40, and a sealing gasket 41 disposed between the housing 30 and a lateral surface 44 of the backing 20 such that the plurality of sealing screws 40 pass through the sealing gasket 41. The number of sealing screws 40 can vary depending on cost considerations. Other conventional sealing mechanisms such as hooks or clamps can also be used. The backing 20 also includes a longitudinal surface 45 having an o-ring slot 43 for disposing an o-ring 42 between the housing 30 and the o-ring slot 43. The preferred sealing mechanism therefore provides protection against moisture along both lateral and the longitudinal surfaces 44 and 45, respectively, of the backing 20.

A plurality of light source risers 21 are attached to the backing 20 to suspend the light source 50 between the housing 30 and the backing 20. The backing 20 also has a riser stabilizing mechanism to couple the light source 50 to the plurality of light source risers 21, shown as plurality of light source stabilizing screws 22. The risers 21 position the LED light source 50 in a desired position with respect to the interior lens.

Figure 4:
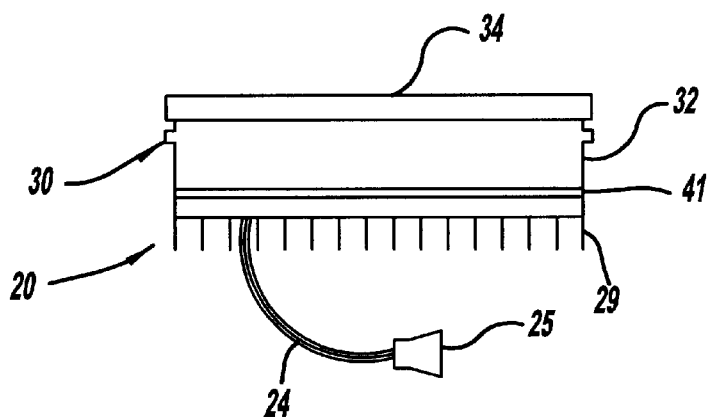
FIG. 4 is a side view of an assembled signaling lamp in accordance with the preferred embodiment of the present invention.
Figure 4A:
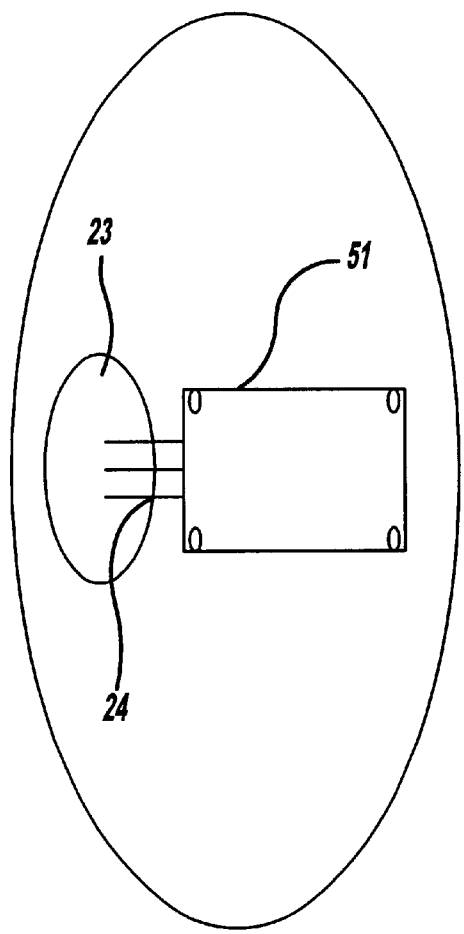
FIG. 4A is a bottom view of the embodiment in FIG. 4.
Figure 4B:
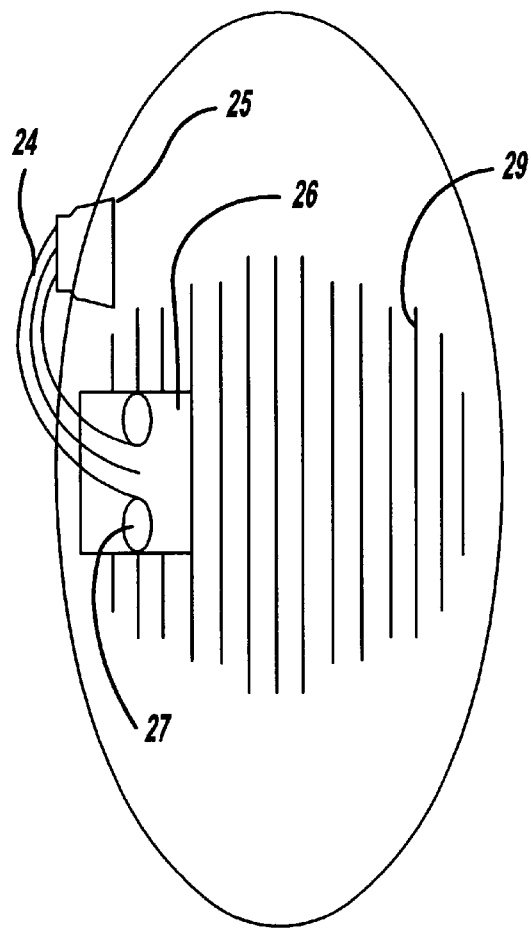
FIG. 4B is a top view of the backing socket hole in FIG. 4.

Furthermore, as best seen in FIGS. 4, 4A and 4B, the backing 20 has a socket hole 23, a pigtail socket 24 extending from the light source 50 through the socket hole 23, a connector 25 attached to the pigtail socket 24 to couple the signaling lamp 10 to a power source (not shown), and a socket hole sealing mechanism to stabilize the pigtail socket 24. The socket hole sealing mechanism is shown as socket hole gasket 26 and plurality of socket hole screws 27 to couple the socket hole gasket 26 to the backing 20. Other methods of protecting against moisture are also available such as external or internal water-resistant sleeves.

Since the preferred light source 50 has an associated current draw circuit board 51, the backing 20 also includes a plurality of circuit board risers 28 to suspend the current draw circuit board 51 between the housing 30 and the backing 20. The backing 20 is preferably made of an aluminum casting and has a heat sink 29 to remove heat from the signaling lamp 10.

Figure 5:
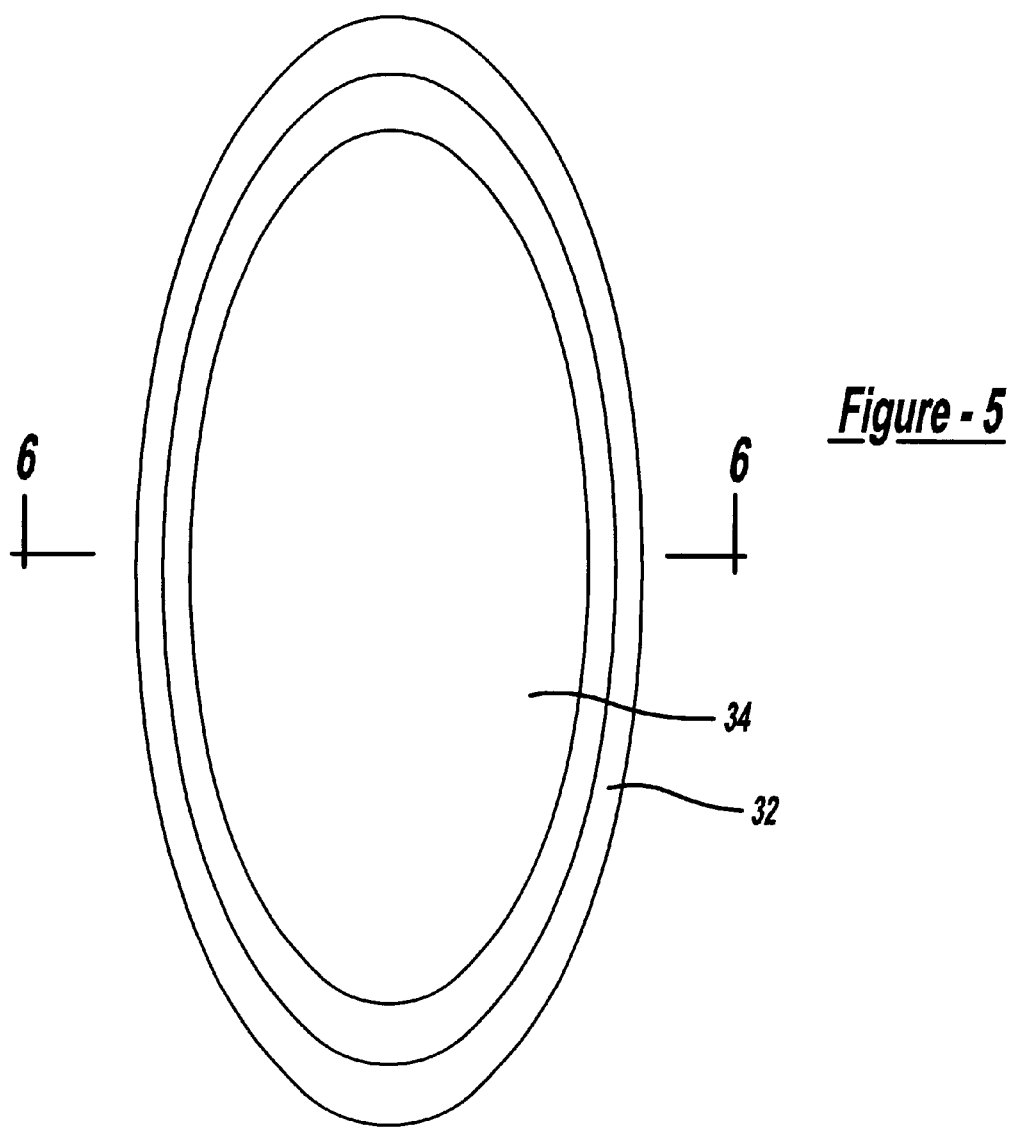
FIG. 5 is a top view of the housing in accordance with the preferred embodiment of the present invention.
Figure 6:
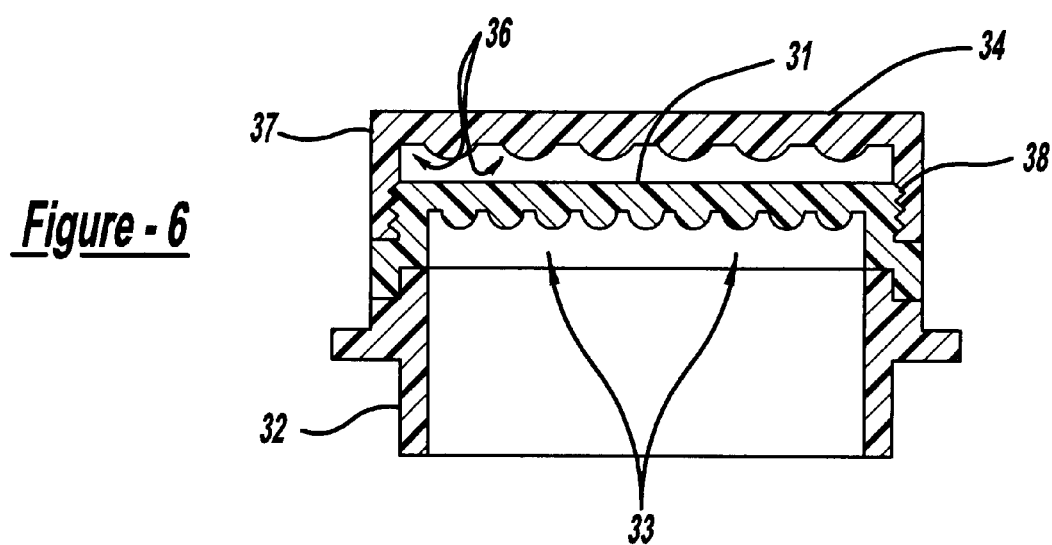
FIG. 6 is a cross sectional view of the housing along line 6 in FIG. 5.

The housing 30 has a casing 32 coupled to the backing 20 by the sealing mechanism, and a lens 31 attached to the casing 32. Light from the light source 50 is therefore directed out of the signaling lamp 10 through the lens 31. As best seen in FIGS. 5 and 6, the interior surface of the lens 31 also has a plurality of convex nodes 33 matching the pattern of the LED array 53 such that light is more effectively directed out of the lamp 10. Lens 31 is typically made of a translucent red-tinted acrylic, but any other color or suitable material can be used, such as, but not limited to, a Lexan material. The outer lens 34 which attaches to the interior lens 31 includes a combination of ridges and faucets 36 on the interior side of the exterior lens 34 to disperse and distribute the light equally over the lens. This improves visibility since the lens extends slightly beyond the mounting surface exposing side edge 37 of the lens 34, which, in turn, makes lens more visible. This secondary exterior lens 34 may be removable which increases the protection to the light source and the serviceability with regard to replacing a cracked lens. This lens can be attached in one or more ways; twist screwed by the end 38 as shown in FIG. 6, or a plurality of screws or ultrasonically sealed to case and interior lens.

The light source 50 preferably has an LED array 53 of 61 LED's and an LED board 52 containing the LED array 53. The light source 50 also preferably includes a current draw circuit board 51 electrically connected to the LED board 52 for reducing the current draw of the signaling lamp 10. The current draw on a 12.80V power source is about 0.027 Amps for tail light operation and about 0.479 Amps for stop and turn operation.

While the above detailed description describes the preferred embodiment of the present invention, the invention is susceptible to modification, variation and alteration without deviating from the scope and fair meaning of the subjoined claims.

What is claimed is:

1. A signaling lamp comprising:

a light source;

a housing;

a backing having a plurality of risers suspending the light source between the housing and the backing such that air surrounds the light source, the backing including a longitudinal surface defining an o-ring slot; and a removable sealing mechanism for coupling the housing to the backing such that the light source is enclosed by the housing and the backing, the sealing mechanism including a plurality of sealing screws for coupling the housing to the backing, a sealing gasket disposed between the housing and a lateral surface of the backing such that the sealing screws pass through the sealing gasket, and an o-ring disposed between the housing and the o-ring slot.

2. The signaling lamp of claim 1 wherein the backing comprises:

a socket hole;

a pigtail socket extending from the light source through the socket hole;

a connector attached to the pigtail socket for coupling the signaling lamp to a power source; and a socket hole sealing mechanism for stabilizing the pigtail socket.

3. The signaling lamp of claim 2 wherein the socket hole sealing mechanism comprises:

a socket hole gasket and an O-ring; and a plurality of socket hole screws for coupling the socket hole gasket to the backing such that the pigtail socket is stabilized.

4. The signaling lamp of claim 1 wherein the backing comprises a heat sink for removing heat from the signaling lamp.

5. The signaling lamp of claim 1 wherein the light source comprises a current draw circuit board and the backing comprises a plurality of circuit board risers for suspending the current draw circuit board between the housing and the backing.

6. The signaling lamp of claim 1 wherein the backing is made of an aluminum casting.

7. The signaling lamp of claim 1 wherein the housing comprises:
   a casing coupled to the backing by the sealing mechanism;
   a first lens attached to the casing, and
   a second lens removably coupled to the first lens.

8. The signaling lamp of claim 7 wherein an interior surface of the first lens comprises a plurality of convex nodes.

9. The signaling lamp of claim 7 wherein the first lens is made of an acrylic material or Lexan.

10. The signaling lamp of claim 1 wherein the light source comprises:
    an LED array; and
    an LED board containing the LED array.

11. The signaling lamp of claim 10 wherein the light source further comprises a current draw circuit board electrically connected to the LED board for reducing a current draw of the signaling lamp.

12. The signaling lamp of claim 7, wherein a secondary lens is removably coupled with said housing.

13. A signaling lamp comprising:
    a light source;
    a housing surrounding said light source, said housing including a first lens for projecting light from said light source;
    a backing removably coupled with said housing, said backing having an external heat sink for removing heat from air contained within the signaling lamp, the backing including surfaces defining a socket hole, a pigtail socket extending from the light source through the socket hole, a connector attached to the pigtail socket for coupling the signaling lamp to a power source, and a socket hole sealing mechanism for stabilizing the pigtail socket;
    a sealing mechanism between said housing and said backing sealing said housing with said backing; and
    a second lens spaced from said first lens for projecting light from said first lens, and said second lens removably coupled with said housing.

* * * * *